US012572285B2

(12) United States Patent
Sharma et al.

(10) Patent No.: US 12,572,285 B2
(45) Date of Patent: Mar. 10, 2026

(54) DATA STORAGE DEVICE AND METHOD FOR POWER SAVING IN A VARIABLE HOST THROUGHPUT ENVIRONMENT

(71) Applicant: Western Digital Technologies, Inc., San Jose, CA (US)

(72) Inventors: Amit Sharma, Bangalore (IN); Dinesh Kumar Agarwal, Bangalore (IN); Abhinandan Venugopal, Mysore (IN)

(73) Assignee: Western Digital Technologies, Inc., San Jose, CA (US)

( * ) Notice: Subject to any disclaimer, the term of this patent is extended or adjusted under 35 U.S.C. 154(b) by 3 days.

(21) Appl. No.: 18/596,212

(22) Filed: Mar. 5, 2024

(65) Prior Publication Data

US 2025/0284414 A1      Sep. 11, 2025

(51) Int. Cl.
G06F 3/06 (2006.01)

(52) U.S. Cl.
CPC .......... G06F 3/0625 (2013.01); G06F 3/0634 (2013.01); G06F 3/0653 (2013.01); G06F 3/0679 (2013.01)

(58) Field of Classification Search
CPC .... G06F 3/0625; G06F 3/0634; G06F 3/0653; G06F 3/0679; G06F 3/0659; Y02D 10/00

USPC .......................................................... 711/154
See application file for complete search history.

(56) References Cited

U.S. PATENT DOCUMENTS

| | | | |
|---|---|---|---|
| 8,286,018 B2 | 10/2012 | Chang et al. | |
| 9,507,402 B2 | 11/2016 | Cooper et al. | |
| 11,670,343 B2 | 6/2023 | Barkley et al. | |
| 2017/0177061 A1* | 6/2017 | Kumar .................. | G06F 3/0625 |
| 2019/0317680 A1 | 10/2019 | Elhamias et al. | |
| 2023/0041215 A1* | 2/2023 | Porzio .................. | G06F 3/0625 |
| 2023/0244293 A1 | 8/2023 | Ware et al. | |

* cited by examiner

*Primary Examiner* — Hua J Song
(74) *Attorney, Agent, or Firm* — Crowell & Moring LLP

(57)      ABSTRACT

A data storage device and method for power saving in a variable host throughput environment are provided. In one embodiment, a data storage device is provided comprising a memory and one or more processors. The one or more processors, individually or in combination, are configured to: detect that a data consumption rate of a host is below a threshold; and in response to detecting that the data consumption rate of the host is below the threshold, enter a power-saving mode by: storing, in the non-volatile memory, a context of a pending host command in a command queue; and reducing power to at least one component of the data storage device. Other embodiments are disclosed.

20 Claims, 9 Drawing Sheets

DATA STORAGE DEVICE AND METHOD FOR POWER SAVING IN A VARIABLE HOST THROUGHPUT ENVIRONMENT

BACKGROUND

Some data storage devices are host-powered and can enter a low-power mode to reduce the amount of consumed host power. For example, a data storage device can enter a low-power mode when no host commands are pending and can exit the low-power mode upon receiving a new host command.

DETAILED DESCRIPTION

Figures 1A, 1B, 1C:
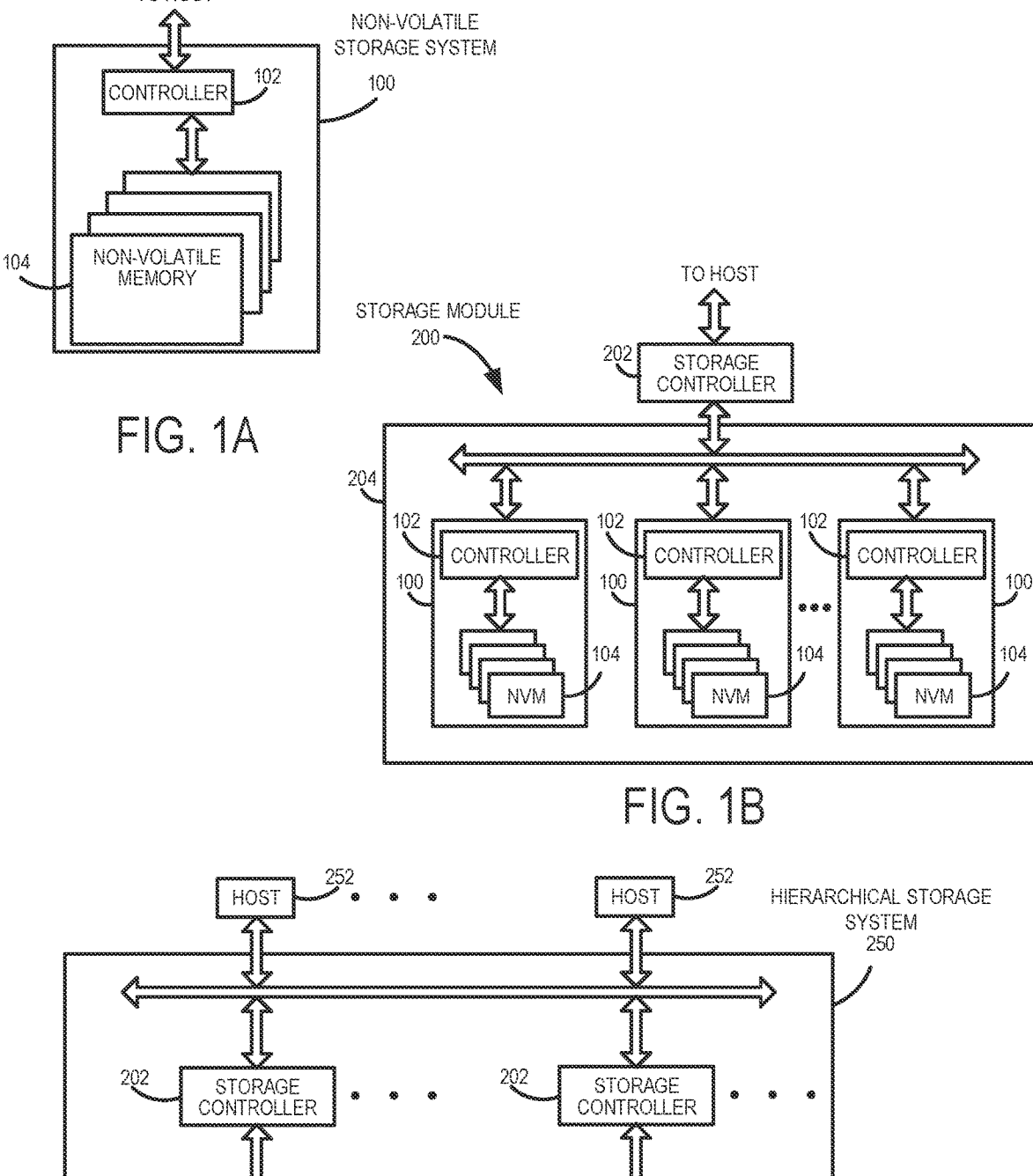
FIG. 1A is a block diagram of a data storage device of an embodiment.
FIG. 1B is a block diagram illustrating a storage module of an embodiment.
FIG. 1C is a block diagram illustrating a hierarchical storage system of an embodiment.

The following embodiments generally relate to a data storage device and method for power saving in a variable host throughput environment. In one embodiment, a data storage device is provided comprising a memory and one or more processors. The one or more processors, individually or in combination, are configured to: detect that a data consumption rate of a host is below a threshold; and in response to detecting that the data consumption rate of the host is below the threshold, enter a power-saving mode by: storing, in the non-volatile memory, a context of a pending host command in a command queue; and reducing power to at least one component of the data storage device.

In some embodiments, the one or more processors, individually or in combination, are further configured to exit the power-saving mode by: reading, from the non-volatile memory, the context of the pending host command; and restoring power to the at least one component of the data storage device.

In some embodiments, the one or more processors, individually or in combination, are further configured to exit the power-saving mode in response to an expiration of a time period.

In some embodiments, the time period is a function of the data consumption rate of the host and a size of a buffer in the host.

In some embodiments, the one or more processors, individually or in combination, are further configured to exit the power-saving mode in response to receiving a new host command from the host.

In some embodiments, the one or more processors, individually or in combination, are further configured to exit the power-saving mode in response to receiving a command from the host to exit the power-saving mode.

In some embodiments, the one or more processors, individually or in combination, are further configured to seek approval from the host of an increase in latency in exiting the power-saving mode.

In some embodiments, the one or more processors, individually or in combination, are further configured to request that the host not send a new host command to the data storage device while the data storage device is in the power-saving mode.

In some embodiments, the one or more processors, individually or in combination, are further configured to perform a handshake with the host to enable use of the power-saving mode.

In some embodiments, the non-volatile memory comprises a three-dimensional memory.

In another embodiment, a method is provided that is performed in a data storage device. The method comprises: determining that there is at least one outstanding host command that has not been completed; and entering a low-power mode even though there is the at least one outstanding host command that has not been completed.

In some embodiments, entering the low-power mode comprises: storing a state of the at least one outstanding host command; and reducing power to at least one component of the data storage device.

In some embodiments, the method further comprises exiting the low-power mode.

In some embodiments, exiting the low-power mode comprises: restoring the state of the at least one outstanding host command; and restoring power to the at least one component of the data storage device.

In some embodiments, the low-power mode is exited in response to an expiration of a time period, receiving a new host command from the host, and/or receiving a command from the host to exit the low-power mode.

In some embodiments, the method further comprises receiving consent from the host for an increase in latency in exiting the low-power mode.

In some embodiments, the method further comprises requesting that the host not send a new host command to the data storage device while the data storage device is in the low-power mode.

In some embodiments, the method further comprises performing a handshake with the host to enable use of the low-power mode.

In some embodiments, the host comprises an autonomous vehicle.

In yet another embodiment, a data storage device is provided comprising: a memory; and means for enter a standby mode in response to detecting that a data consumption rate of a host is below a threshold, wherein the standby mode power is entered even though there is at least one pending host command.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
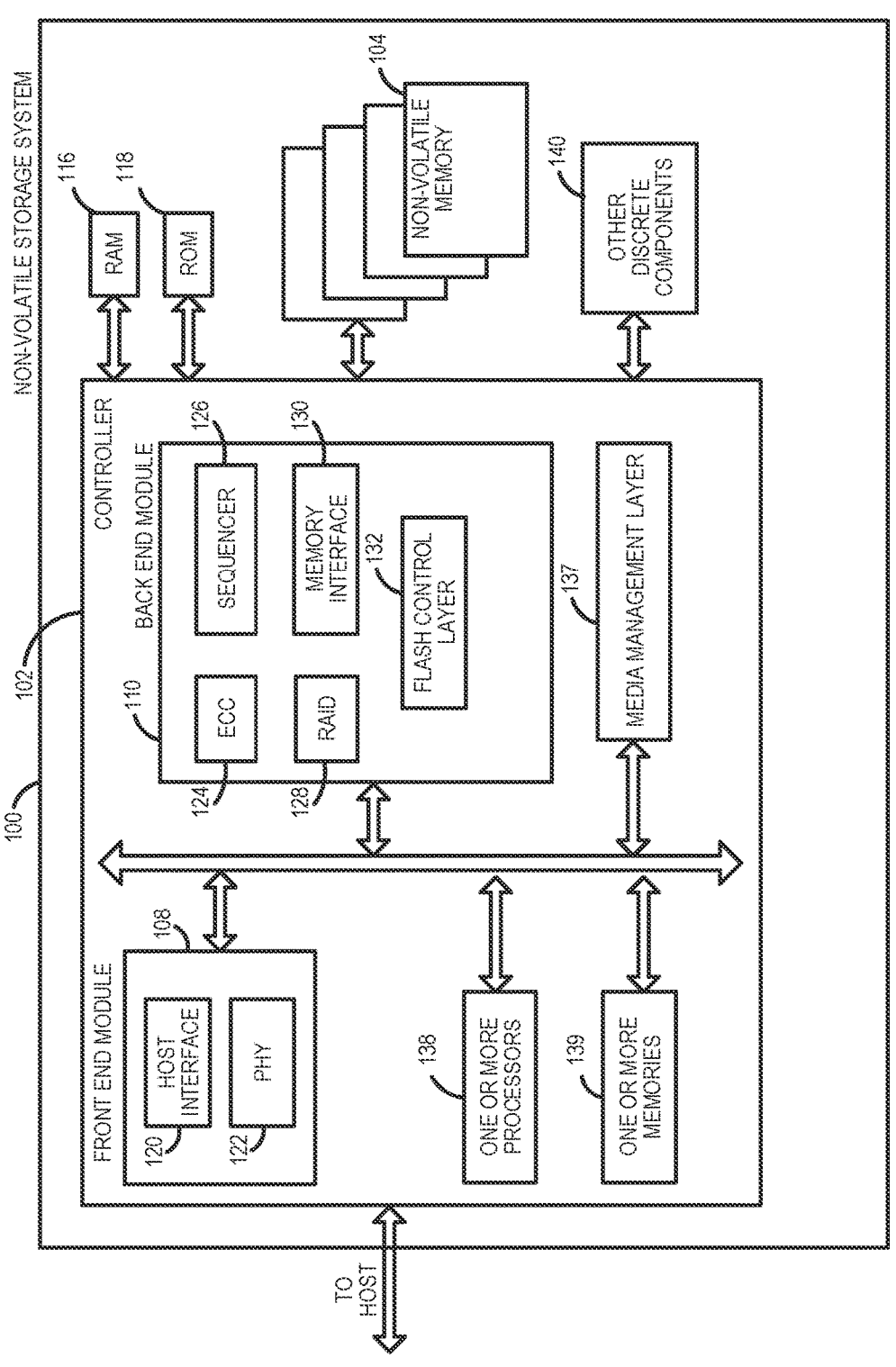
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
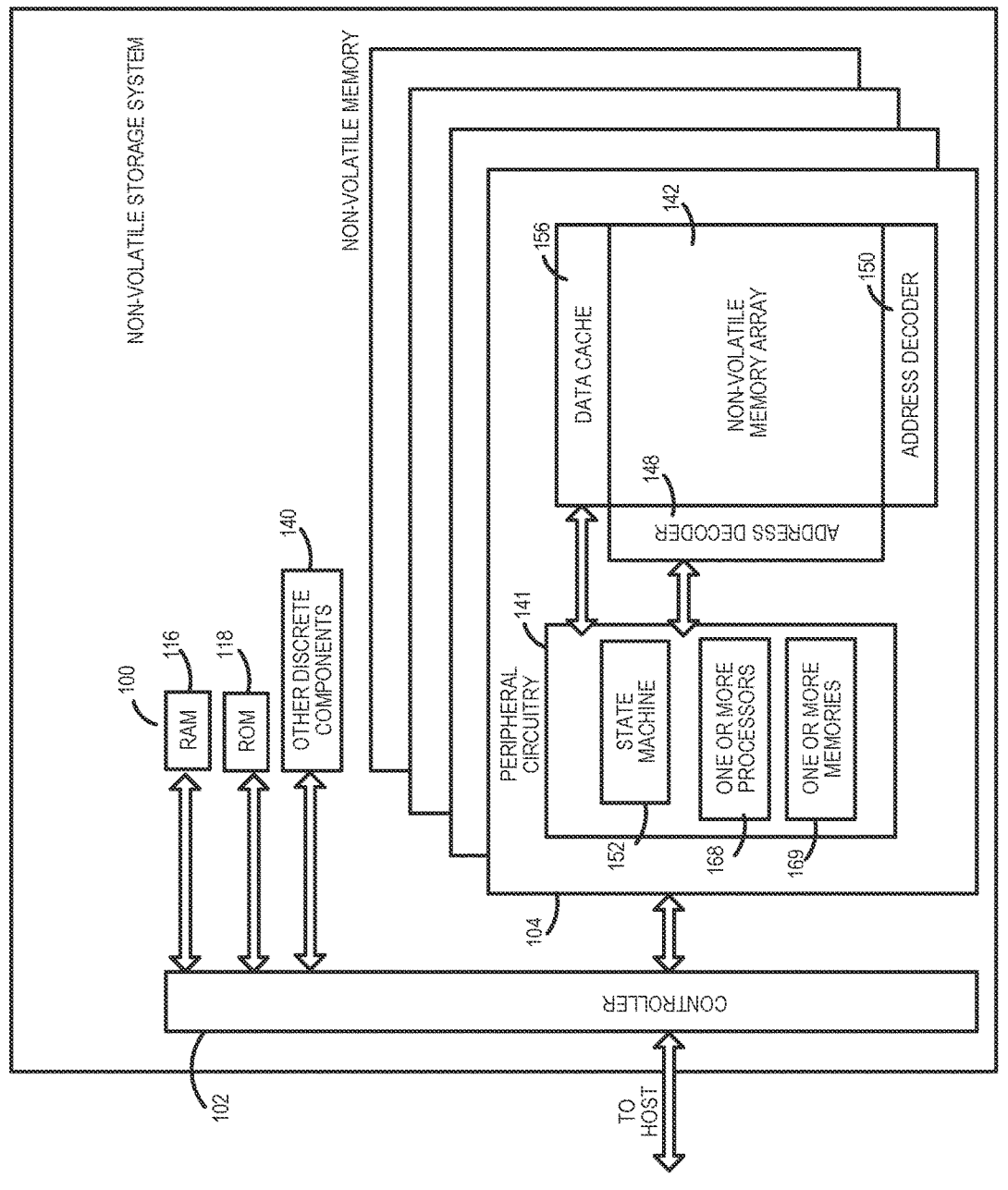
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
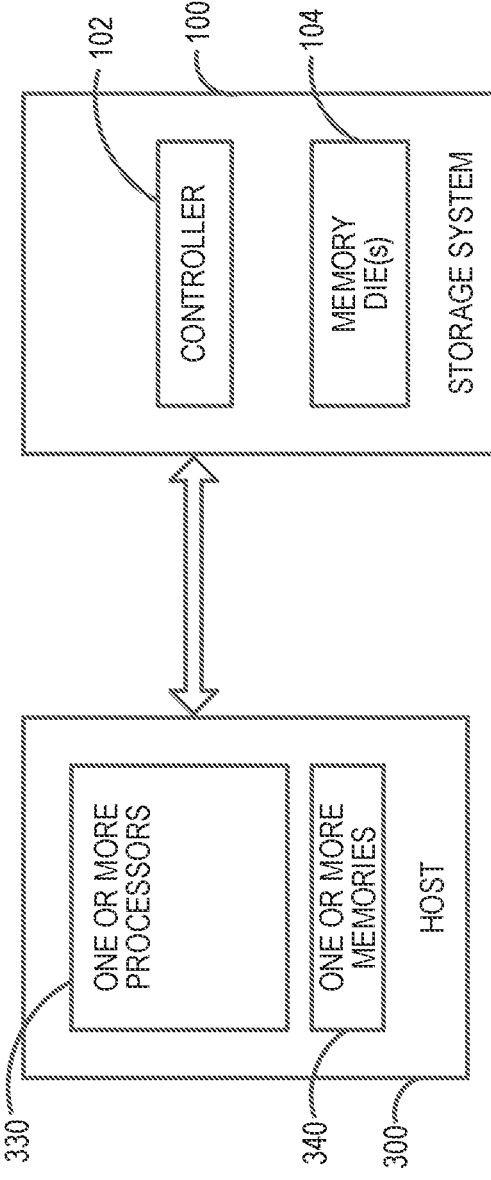
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc.

The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

Low power consumption is often desired by hosts ranging from portable data storage devices to data storage devices in data centers. Various host protocols can specify power levels for a data storage device, and each power level can consume power within specified limits. In general, higher power levels/modes are more power efficient. The following is an example classification system:

| Power Mode/Level | Brief Description |
|---|---|
| PM0 (Active) | Data storage device is active and performing NAND operations |
| PM1 (Device Idle) | Date storage device is idle, and host commands are pending. The data storage device is allowed to perform background operations. If no host commands are pending, a timeframe is given to the data storage device to perform background operations |
| PM2 (Standby) | Data storage device is in standby mode with no active host commands. |

Of the example power levels specified above, the PM2 state would consume the least power. To enter this mode, the data storage device should not have any pending host commands. So, when there are no pending host commands, a data storage device can implement higher power modes by cutting power to various components (e.g., RAM and other hardware components). With each power mode, the data storage device can be configured to honor exit latency (e.g., a timeframe in which the data storage device should be able to accept/serve a new host command). For example, if the data storage device is in the PM2 state and a new host command arrives, the data storage device should be ready to serve this command in a specified timeframe (e.g., in a few milliseconds). However, there are situations where there can be drop in the rate at which the host is able to consume data. For example, an autonomous vehicle can generate a very large amount of data that is stored locally and then transferred to cloud/servers for training/investigation/decision-making purposes. Because the data generated is so large, the data is transferred from the vehicle (host) to the cloud/servers using wireless communication can take a relatively-long time. An example of this environment is shown in FIG. 4.

Figure 4:
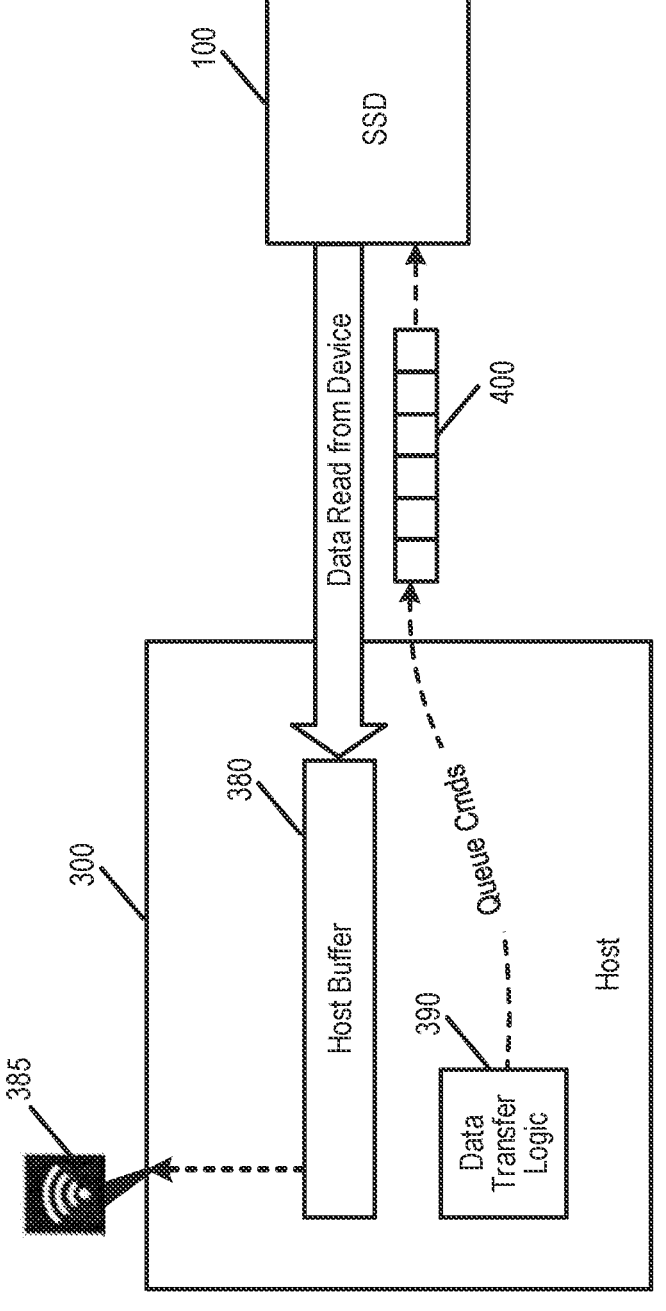
FIG. 4 is a block diagram of a vehicle and a solid-state drive (SSD) of an embodiment.

As shown in FIG. 4, in this example environment, the host 300 (here, an autonomous vehicle) is in communication with the data storage device 100 (here, a solid-state drive (SSD)). The host 300 has data transfer logic 390, which can be implemented by the one or more processors 330 in the host 300 executing computer-readable program instructions stored in the one or more memories 340 in the host 300. The data transfer logic 390 is configured to control the transfer of data in to and/or out of the host 300. In operation, the host 300 generates data and stores it in the memory of the data storage device 100. At some point, the host 300 reads the data from the data storage device 100 and transfers the data to a network, "the cloud," a server, etc. (e.g., via a wireless transceiver/antenna 385, a wired connector, etc.). However, there can be situations where network connectivity is low, in which case data consumption at the host 300 would be reduced. From the data storage device's perspective, the data storage device 100 would observe multiple host commands pending in the queue 400 (which can be in the data storage device 100, the host 300, and/or another location), but the rate at which the host 300 is consuming data (or command completion) would be low. Because there are commands pending in the queue 400, the data storage device 100 cannot go to PM2 mode under the example power scheme discussed above, as the primary condition for the data storage device 100 to go to deep power-save mode is not having any pending host commands. So, even though there is minimal or no response required from the data storage device 100, the data storage device 100 cannot enter standby mode because of the presence of the pending host commands in the queue 400.

The following embodiments can be used to address this problem by allowing the host 300 and the data storage device 100 to work together to enable the data storage device 100 to enter a power-saving mode. As used herein, a power-saving mode (which is sometimes referred to herein as a low-power mode or a standby mode) can generally refer to a mode that consumes relatively-less power than another mode (e.g., a "normal" mode of operation or any other mode that consumes relatively-more power). In the power-saving mode, power can be removed or reduced from one or more hardware components in the data storage device 100 (e.g., hardware cores, volatile memories, a portion of the non-volatile memory 104, latching logic, a physical layer interface, etc.).

A power-saving mode can be configured to allow the data storage device 100 to save power without impacting performance. In one embodiment, the controller 102 of the data storage device 100 is configured to detect situations where even though host commands are pending in the data storage device 100, the rate at which the host 300 is consuming/providing data is below a threshold (e.g., a configurable or pre-determined threshold). In these situations, the controller 102 can save the pending host command context or state and enter the power-saving mode even though there are host commands pending in the data storage device 100. As used herein, a command context can refer to various data generated or used by a command in its execution. For example, command number, LBAs information, user data stored in a write cache buffer, management data (e.g., logical-to-physical address mapping data) stored in volatile memory, data latched in latching logic, etc. can be written (flushed) to the non-volatile memory 104 and/or stored in volatile memory (if any) that is powered during the power-saving mode.

When the data storage device 100 wakes up, the controller 102 can load back the host command contexts and resume host command execution. Further, the controller 102 of the data storage device 100 can collaborate with the host 300 so that the host 300 would not queue up more commands for certain time, as queueing up a new command can take the data storage device 100 out of the power-saving mode (which may not be a problem for the host 300, as the host 300 may not be consuming data at a lower rate). As the data storage device 100 may need additional time to load the command context after exiting power-saving mode, the host 300 can acknowledge that this extra latency is acceptable.

These embodiments can be implemented in any suitable way. The following paragraphs provide examples of such implementations. It should be noted that these are merely examples and that other implementations can be used.

In one example implementation, the controller 102 is configured to detect situations where the host's data consumption speed is reduced (e.g., from 100 megabytes per second (MBps) to one MBps) or stalls (e.g., for some period of time). In such situation as the host 300 does not need data for some time (or at lower rate), the controller 102 can cause the data storage device 100 to enter a low-power mode to conserve power. However, as noted above, if there are pending host commands, the data storage device 100 may be prevented from entering the low-power mode. Also, even if the data storage device 100 enters the low-power mode, the host 300 can queue one or more new commands, which would cause the data storage device 100 to exit the low-power mode. Further, even when in low-power mode, certain volatile memory (e.g., RAM) components/clocks may need power to keep functioning. So, in this embodiment, the controller 102 can save the context of the pending host commands in such volatile memory and/or the non-volatile memory 104. When the data storage device 100 exits the low-power mode, the controller 102 can fetch the command information from its storage location and resume command execution. In an alternate implementation, the components in the data storage device 100 used for the host command queue can be powered on during the low-power mode even though they may consume more power compared to the "standard" low-power mode.

As mentioned above, there can be issues originating from host side. For example, the host 300 sending command(s) to the data storage device 100 while it is in low-power mode can cause the data storage device 100 to exit the low-power mode. The data storage device 100 typically does not have control over this, as it typically cannot cause the host 300 to delay sending commands to the data storage device 100. Also, the host 300 can experience extra latencies when the data storage device 100 exits the low-power mode, as the controller 102 of the data storage device 100 needs time to load the host command contexts from their storage locations.

To address these issues, a host-device "handshake" can be used. More specifically, in the situation where the controller 102 of the data storage device 100 detects that there is a possibility of entering the low-power mode, the controller 102 can communicate with the host 300 to make one or more requests. For example, the controller 102 can request that the host 300 not send more host commands to the data storage device 100 for a certain amount of time. This should not be an issue for the host 300, since host itself is slower at consuming data (which is the first reason the device 100 is entering the power saving mode). In response to the request, the host 300 can check its internal buffers (e.g., in the one or more memories 340_ to see how long the buffered data can satisfy the needs of the host 300 before the host 300 needs to send a new command to the data storage device 100.

Regarding the additional latency from exiting the low-power mode, the controller 102 can ask the host 300 if such additional latency is acceptable. In many situations, it is expected that the host 300 will accept the additional latency, as when the data storage device 100 does into low-power mode, it may already be determined that device speed will not impact the performance of the host 300.

Figure 5:
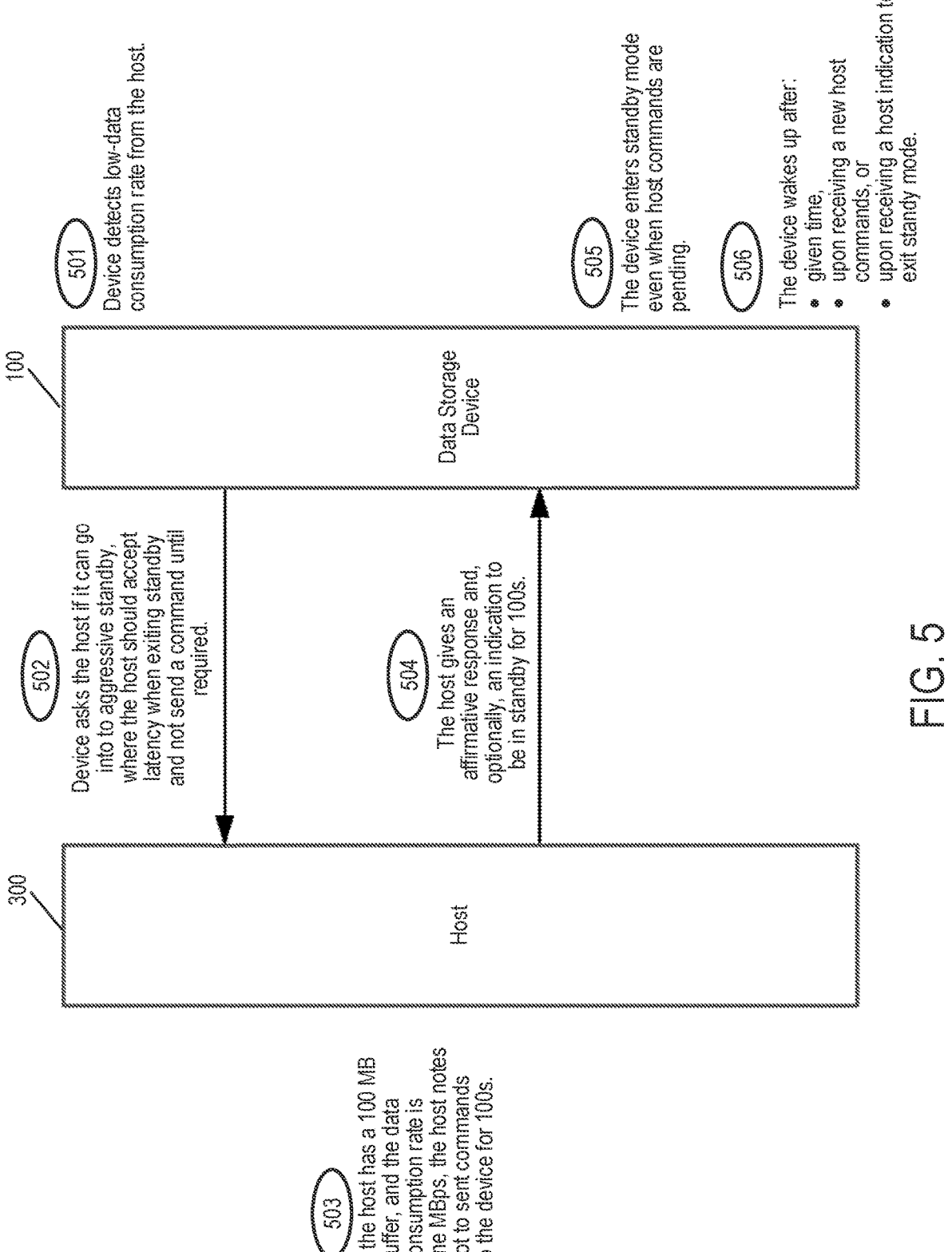
FIG. 5 is a flow diagram of a host-device handshake of an embodiment.

FIG. 5 is a flow diagram of a host-device handshake of an embodiment. As shown in FIG. 5, the data storage device 100 detects a low data consumption rate from the host 300 (act 501) and asks the host 300 if the host 300 can go to an aggressive standby mode (act 502). In this example, the host 300 has a 100 MB buffer, the data consumption is one MB per second (MBps), and the host 300 notes not to send commands to the data storage device 100 for 100 seconds. The host 300 then gives an affirmative response to the data storage device 100 and can also give an indication to be in standby for 100 seconds (act 504). In response, the data storage device 100 enters standby mode even when host commands are pending (act 505). The data storage device 100 wakes up after a given time, or upon receiving a new host command, or upon receiving a host indication to exit standby mode (act 506).

This embodiment can help address the problem noted above when a relative-large amount of data is wirelessly transferred from the host 300 (an autonomous vehicle) to a network. For example, assume the host 300 has a 100 MB internal buffer from which transfers data to a wireless network. If the wireless network transfer speed drops from 10 MBps to 1 MBps, the host 300 has enough data for 100 seconds. The host 300 can inform the data storage device 100 that it can go into low-power mode for 100 seconds. Alternatively, the host 300 can send an indication/command for the data storage device 100 to exit the low-power mode.

Figure 6:
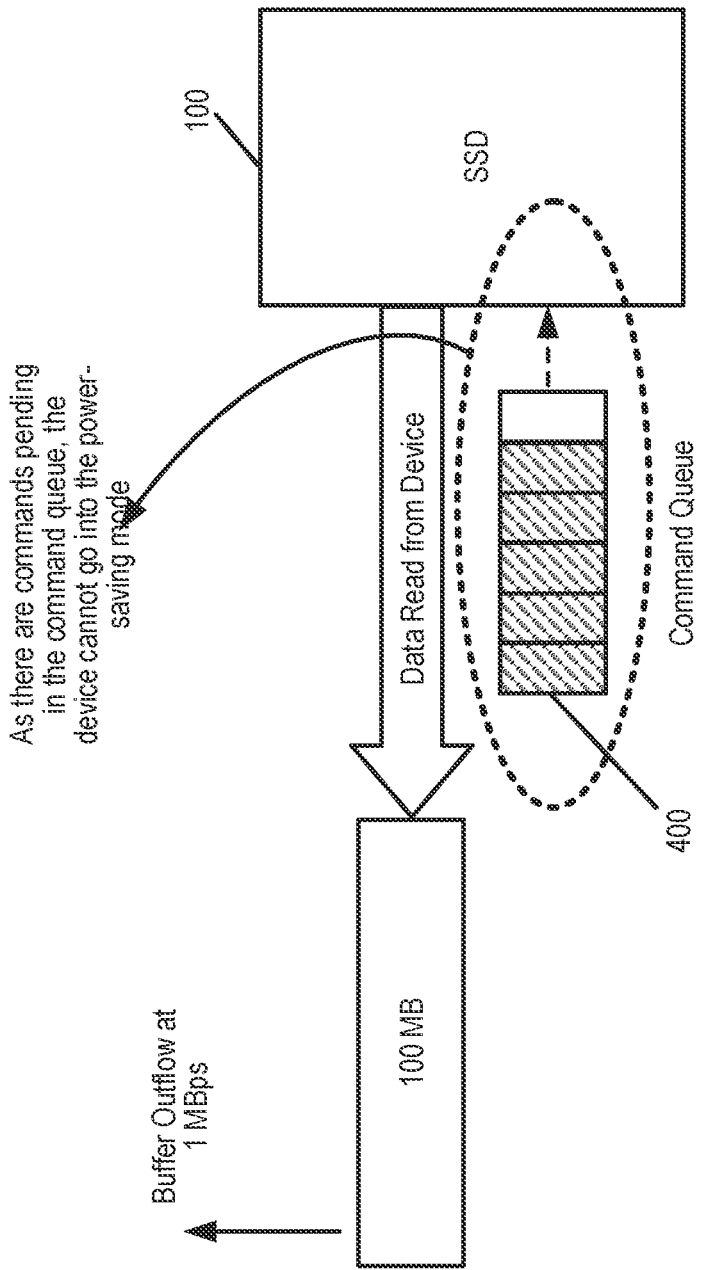
FIG. 6 is an illustration of an embodiment in which pending host commands prevent a data storage device from entering a low-power mode.
Figure 7:
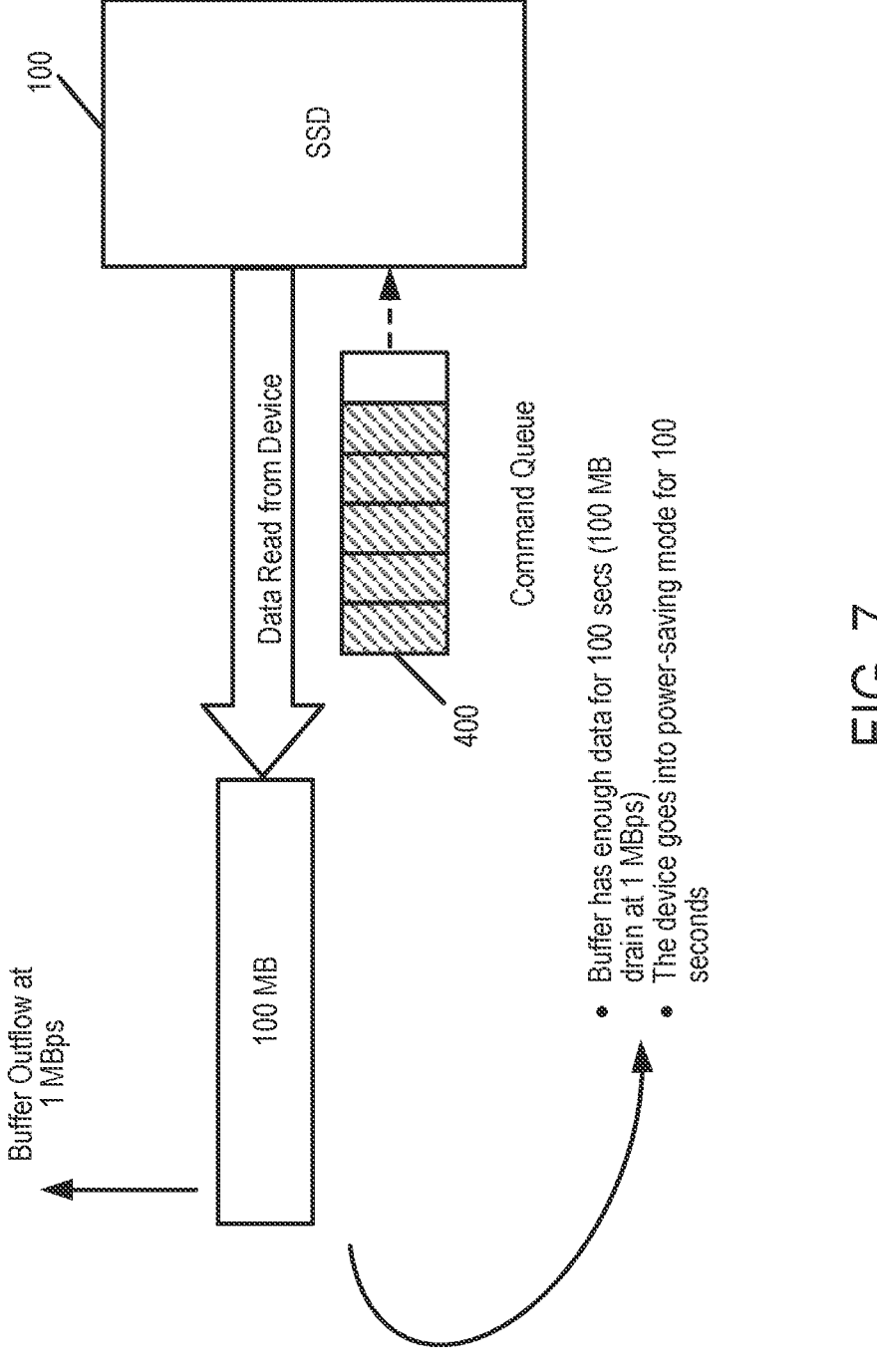
FIG. 7 is an illustration of an embodiment in which pending host commands do not prevent a data storage device from entering a low-power mode.

FIGS. 6 and 7 illustrate an advantage of this embodiment. FIG. 6 shows that, without using this embodiment, pending host commands can prevent the data storage device 100 from entering a low-power mode. FIG. 7 shows that, with this embodiment, pending host commands do not prevent a data storage device from entering a low-power mode.

Another approach to achieve this communication can be a host-device handshake during device initialization. Once the host 300 knows about this new standby mode, the host 300 can enable or disable this feature. If this mode is enabled, the data storage device 100 is allowed to go to the new standby mode even if there are commands pending. In this example handshake, the host 300 is agreeing to some additional delay when the data storage device comes out of the standby mode.

Figure 8:
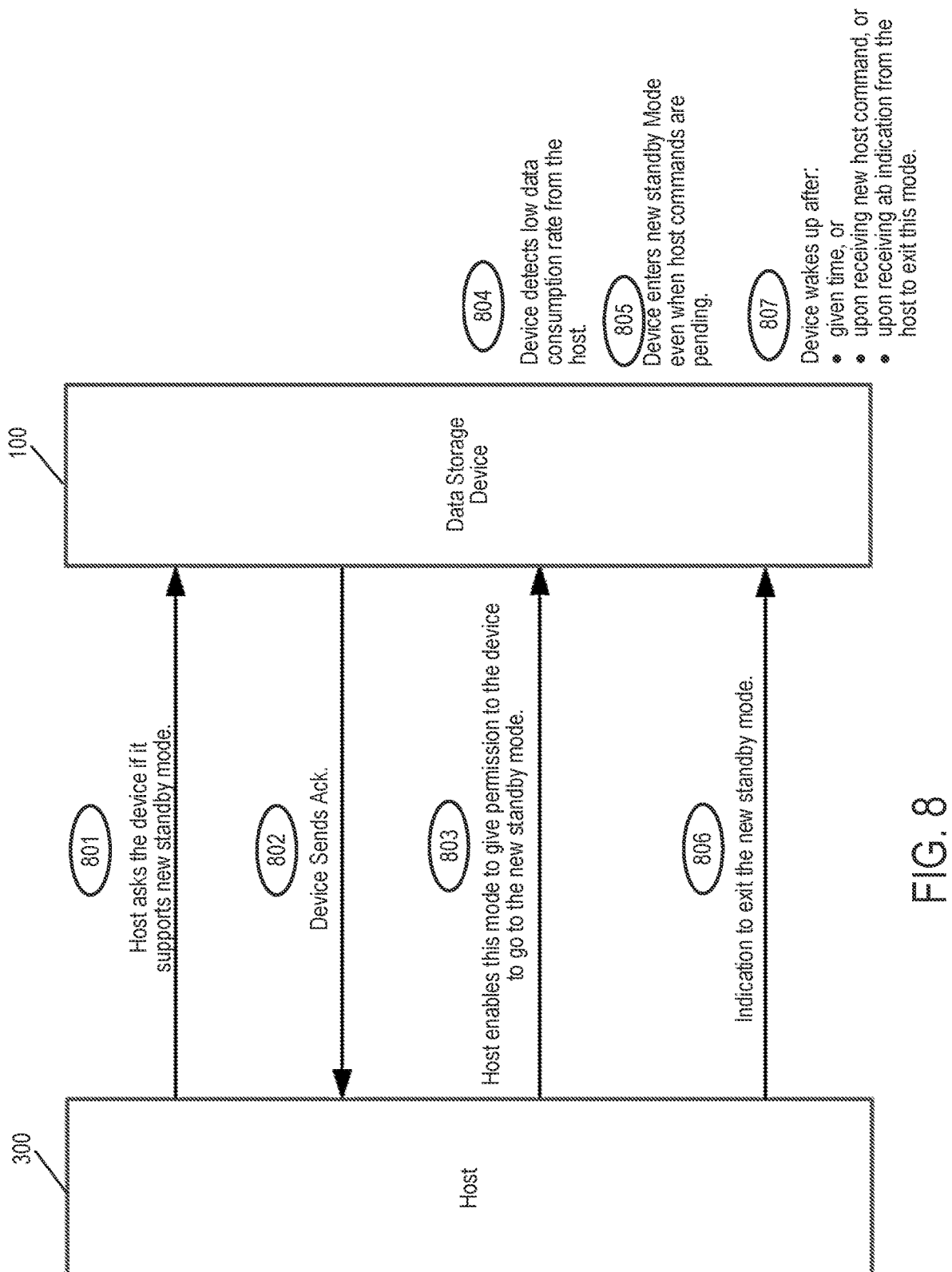
FIG. 8 is a flow diagram of a host-device handshake of an embodiment that takes place during device initialization.

FIG. 8 is a flow diagram of a host-device handshake of an embodiment that takes place during device initialization. As shown in FIG. 8, the host 300 asks the data storage device 100 if it supports the newer standby mode (act 801), and the data storage device 100 sends an acknowledgement (act 802). The host 300 enables this move to give permission to the data storage device 100 to go to the newer standby mode (act 803). The data storage device 100 then detects a low data consumption rate from the host 300 (act 804) and enters standby mode even when host commands are pending (act 805). The data storage device 100 wakes up after a given time, a new host command, or a host indication to exit this mode (act 807).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/ or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:
1. A data storage device comprising:
  a non-volatile memory; and one or more processors, individually or in combination, configured to:

detect that a data consumption rate of a host is below a threshold;

in response to detecting that the data consumption rate of the host is below the threshold, send, to the host, a request that the host not send an additional host command for an amount of time that the data storage device will be in and exit from a power-saving mode; and in response to receiving, from the host, acceptance of the request, enter the power-saving mode by:

storing, in the non-volatile memory, a context of a pending host command in a command queue; and reducing power to at least one component of the data storage device.

2. The data storage device of claim 1, wherein the one or more processors, individually or in combination, are further configured to exit the power-saving mode by:

reading, from the non-volatile memory, the context of the pending host command; and restoring power to the at least one component of the data storage device.

3. The data storage device of claim 2, wherein the one or more processors, individually or in combination, are further configured to exit the power-saving mode in response to an expiration of a time period.

4. The data storage device of claim 3, wherein the time period is a function of the data consumption rate of the host and a size of a buffer in the host.

5. The data storage device of claim 2, wherein the one or more processors, individually or in combination, are further configured to exit the power-saving mode in response to receiving a new host command from the host.

6. The data storage device of claim 2, wherein the one or more processors, individually or in combination, are further configured to exit the power-saving mode in response to receiving a command from the host to exit the power-saving mode.

7. The data storage device of claim 1, wherein the one or more processors, individually or in combination, are further configured to seek approval from the host of an increase in latency in exiting the power-saving mode.

8. The data storage device of claim 1, wherein the one or more processors, individually or in combination, are further configured to perform a handshake with the host to enable use of the power-saving mode.

9. The data storage device of claim 1, wherein the non-volatile memory comprises a three-dimensional memory.

10. A method comprising:

performing in a data storage device:

determining that at least one outstanding host command that has not been completed;

sending, to a host, a request that the host not send an additional host command for an amount of time that the data storage device will be in and exit from a low-power mode; and in response to receiving, from the host, acceptance of the request, entering the low-power mode even though the at least one outstanding host command has not been completed.

11. The method of claim 10, wherein entering the low-power mode comprises:

storing a state of the at least one outstanding host command; and reducing power to at least one component of the data storage device.

12. The method of claim 10, further comprising exiting the low-power mode.

13. The method of claim 12, wherein exiting the low-power mode comprises:

restoring the state of the at least one outstanding host command; and restoring power to the at least one component of the data storage device.

14. The method of claim 12, wherein the low-power mode is exited in response to an expiration of a time period.

15. The method of claim 14, wherein the time period is a function of a data consumption rate of the host and a size of a buffer in the host.

16. The method of claim 12, wherein the low-power mode is exited in response to receiving a new host command from the host.

17. The method of claim 12, wherein the low-power mode is exited in response to receiving a command from the host to exit the low-power mode.

18. The method of claim 10, wherein the host comprises an autonomous vehicle.

19. The method of claim 10, wherein the host comprises an autonomous vehicle.

20. A data storage device comprising:

a memory; and means for:

detecting that at least one pending host command has not been completed;

sending, to a host, a request that the host not send an additional host command for an amount of time that the data storage device will be in and exit from a standby mode; and in response to receiving, from the host, acceptance of the request, entering the standby mode even though the at least one pending host command has not been completed.

* * * * *